United States Patent [19]

Cochet et al.

[11] 4,346,177

[45] Aug. 24, 1982

[54] PULVERULENT COMPOSITIONS AND REFRACTORY ARTICLE OBTAINED WITH SAID COMPOSITION

[75] Inventors: Gerard Cochet, Plaisir; Gilbert Provost, Les Breviaires, both of France

[73] Assignee: Societe Anonyme dite: Carbonisation Entreprise et Ceramique, Montrouge, France

[21] Appl. No.: 208,023

[22] Filed: Nov. 18, 1980

[30] Foreign Application Priority Data

Nov. 19, 1979 [FR] France .............................. 79 28418

[51] Int. Cl.³ .............................................. C04B 35/02
[52] U.S. Cl. .................................... 501/123; 501/124; 501/133
[58] Field of Search ........................ 106/64, 69, 104; 501/123, 124, 133

[56] References Cited

U.S. PATENT DOCUMENTS 3,802,894  4/1974  Prost et al. .............................. 106/64
4,102,695  7/1978  Claverie ................................. 106/64

*Primary Examiner*—James Poer
*Attorney, Agent, or Firm*—Cushman, Darby & Cushman

[57] ABSTRACT

A pulverulent composition for admixture with a refractory aggregate and water to provide refractory articles, including bricks for the construction of thermal enclosures, comprises as a first portion, 70–96% by weight of silica, either vitreous or amorphous, of which the particles have a diameter lower than 1 μm; as a second portion, 4–30% by weight of a compound capable of supplying 1–20% by weight of alkaline earth oxide; and as a third portion, 0.5–3% by weight of a fluidizing or dispersing agent.

5 Claims, 1 Drawing Figure

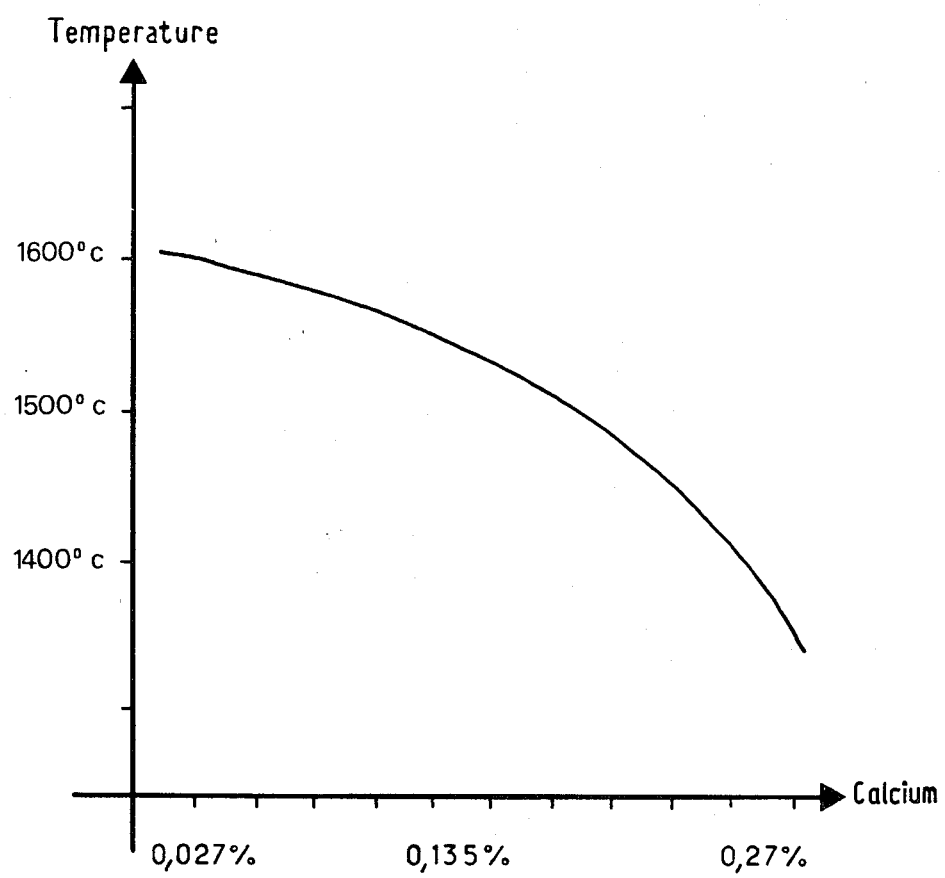

PULVERULENT COMPOSITIONS AND REFRACTORY ARTICLE OBTAINED WITH SAID COMPOSITION

The present invention relates to a shaped refractory product which, without necessarily being calcined, exhibits physical, thermo-mechanical and thermo-chemical characteristics at least equivalent to those of known calcined shaped refractory products.

By avoiding calcination, the present invention eliminates such disadvantages, as principally, an excessive or large expenditure of energy, slow production rates and certain dimensional imprecisions of the product resulting from deformations caused by calcination.

In accordance with currently known techniques, a mixture constituted by a granulated powder and water is prepared and placed in a mold to provide the desired form. The resulting products are then stabilized by calcining at a temperature generally near the service temperature in order to ceramically bond the components and to dimensionally stabilize the products.

Putting the said mixture in a mold implies the use of pressure. It is well known, however, to the skilled artisan that it is quite difficult to achieve, using industrial pressure means at a high delivery rate, a porosity lower than 15% although it is of the greatest interest to obtain a minimal porosity since it determines or controls, to a large extent, the qualities of the refractory products.

But in order to achieve a porosity lower than 15% only mixtures are prepared wherein the granular distribution is difficulty compatible with industrial pressure means.

In effect, this granular distribution involves (1) either a significant lamination of the products due to air being entrapped at the moment when pressure is applied; or (2) a contraction or shrinking during calcination which attains intolerable values; or (3) both these disadvantages concurrently.

This is why known industrial mixtures are only a compromise between their ability to be shaped industrially and the qualities of the resulting calcined products, principally, their porosity.

Another known method for producing refractory products consists in using hydraulic concrete type mixtures. These mixtures (pulverulent composition and water) are molded by casting and vibration, resulting in products which have interesting characteristics for certain uses. But the proportion of alkaline earth based hydraulic binder which they must contain remains relatively high, even if it has been able to be reduced in a perceptible manner. Notwithstanding the quality of the products, such as their thermo-mechanical characteristics, is reduced.

Besides, producing such products by casting and vibration in a single mold prohibits large scale shaping by reason of the time required for hydraulic solidification of the concrete before unmolding.

It is known, for example, from French Pat. No. 2,390,400 the use of a cement for producing concrete. This cement however has effects quite different from that of the present invention which is used only to supply alkaline earth oxide. The casting of a concrete in a mold, followed by vibration, as is indicated in this French patent at page 3, lines 5–7, causes particle arrangement according to simple juxtaposition and not according to an interlocking phenomenon as is explained hereafter.

The pressure produces, in reality, an effect by which the grains are in some way "broken" which assists this interlocking thereby resulting in the production of a sort of "skeleton." This imparts to the article itself suitable and immediately obtained steadiness since the unmolding operation does not require more than 10–20 seconds. On the other hand, the casting of concrete in a mold according to known procedures requires, as a solidification period, a minimum of ½ hour and more frequently three hours due to the fact that particle arrangement according to a simple juxtaposition does not produce this "skeleton" effect and consequently it is necessary to wait a relatively long time for the mixture to solidify in the mold.

This prior known operation can be neither mechanized nor automated notwithstanding that industrial pressure can be effected by means of machines with repetitive cycles and with great efficiency.

These differences between the present invention and the prior art proceed from the compositions used, as is evident from the explanations given in French Pat. No. 2,390,400, page 1, lines 15–25 where it is stated, without equivocation, that the sought after granulometry prevents the formation of gels or sols, this statement being repeated at page 3, lines 2 and 28, which is contrary to the characteristics of the composition of the present invention as explained below.

In effect, according to French Pat. No. 2,390,400, it is essential to combine two mineral constituents, the nature of which is of little importance, in two areas of extremely precise granulometry. The invention described in this French patent requires the presence in the cement, not mixed with an aggregate, of an inert charge.

On the other hand, in accordance with the present invention, the composition destined to be mixed with an aggregate includes only two components and a fluidizing or dispersing agent, one of these two components having a fine granulometry but not rigorously limited to a precise range.

Moreover, the composition of the present invention requires that the components be of a very exact nature and not arbitrarily selected.

As far as it is necessary, it must be noted that the ratio of silica/cement has a value between 0.5 and 5.4 in French Pat. No. 2,390,400 (calculation resulting from claim 1) whereas according to the present invention, this same ratio has a value which ranges from 24 to 2.33.

In Japanese Pat. No. 79/133,617 (resume published in Chemical Abstracts), there is disclosed a composition which necessarily is calcined. On the other hand, the composition of the present invention is especially useful in the crude or raw or uncalcined state. Of course, the composition of the present invention may be calcined, but, certainly, this additional operation is not indispensible to secure the advantages of the present invention.

The porosity achieved with regard to known methods and compositions is only 15% after calcination, whereas according to the present invention, a porosity of 13.5% can be achieved with simple stoving at 110° C., as a result of the difference in composition. As can be seen, the aluminous cement, in this Japanese reference, is present in an amount of 8%, whereas according to the present invention, the aluminous cement is present in an amount of only 0.1 to 1%. This represents a complete difference in the nature of the respective compositions and of the resulting associated physico-chemical phenomena.

The above-mentioned Japanese patent also contemplates the presence of silica in an amount of 4%, whereas according to the present invention the silica content ranges from 1.4 to 19.2%. Even though the silica content disclosed in the said Japanese patent lies between the limits established for the present invention, this is simply a coincidence, since the relative amounts of silica and cement in the Japanese patent are exactly inverse with respect to that in the present invention. In effect, according to this Japanese patent, there is 4% silica and 8% aluminous cement, or a ratio of 0.5 whereas according to the present invention, the amount of silica (1.4 to 19.2%) and the amount of cement, as the supplier of alkaline earth oxide, (0.1 to 1%) result in a ratio ranging from 24 to 2.33, as noted above.

The composition according to the present invention comprises two very precise components and a fluidizing or dispersing agent for use in admixture with an aggregate and with a small amount of water so as to provide a gel which is formed in place. The use of pressure provides articles ready for use in a very short time, thereby permitting the use of a mechanized, automated and industrial system. The composition of these products does not require for their stabilization a calcination operation.

Thus, the present invention relates to a pulverulent composition for admixture with a refractory aggregate and water so as to provide refractory articles, such as bricks for the construction of thermal enclosures, which comprises as a first portion, 70 to 96% by weight of silica, either vitreous or amorphous, of which the particles have a diameter lower than 1 μm; as a second portion, 4–30 weight percent of a compound capable of supplying 1 to 20 weight percent alkaline earth oxides; and as a third portion, 0.5 to 3 weight percent of a fluidizing or dispersing agent.

The silica is solubilized by water and the resulting hydrolysis results, on subsequent drying in a precipitation of the gel formed.

The silica, combined with a small amount of components favoring its solubilization, constitutes a binder for the refractory aggregate.

Representative components favoring the solubilization of the silica include, advantageously, alkaline earth ions supplied, preferably, by a hydraulic binder.

This combination contains a fluidizing or dispersing agent which permits the deflocculation of the fine and ultrafine fraction of the constituents, thereby facilitating the homogeneous distribution of all the particles, while at the same time permitting the amount of binder, relative to the whole, to be limited.

The deflocculation generates, moreover, a lubricating action which reduces the amount of water theoretically required for the arrangement of the particles by compacting.

According to another embodiment of the present invention, a pulverulent composition, such as defined above, is mixed with a refractory aggregate of which at least 5 weight percent comprises particles having a diameter lower than 20 μm, this aggregate component representing 80 to 98% of the total weight of the whole. This mixture also contains silica, either vitreous or amorphous, of which the particles have a diameter lower than 1 μm, in an amount of 1.4 to 19.2 weight percent, a compound for supplying alkaline earth oxide in an amount of 0.08 to 2 weight percent and a fluidizing or dispersing agent in an amount less than 0.6 weight percent.

The present invention relates more precisely, to such a composition which contains 0.1 to 1% by weight of said compound and in accordance with a variation, 4 to 10% by weight of silica, either vitreous or amorphous.

The perfectly mixed compound and refractory aggregate are added to water, as noted above, and the combination is compacted in a mold under a pressure in the order of 300 to 500 bars which is rapidly reached and maintained for a short time so as to obtain a refractory article, such as a brick, for the construction of thermal enclosures.

A particular bonding is obtained by hydrolysis of the ultra-fine vitreous (or amorphous) silica, distributed in a homogeneous manner among the particles of the aggregate in the presence of a small amount of alkaline earth ions. This hydrolysis leads to the formation of a gel which precipitates in the course of drying by cementing the particles.

The alkaline earth ions can be supplied either by the first materials themselves, suitably selected, or by an added compound.

But these alkaline earth ions are preferably supplied by an hydraulic binder (cement) which can be present only in an extremely small amount, i.e., less than 1% by weight of the combined binder-aggregate.

In effect, the hydrolysis action with the formation of a gel which is then consolidated on drying, decreases when the amount of alkaline earth increases.

Inversely, when the amount of compound (and then the weight of alkaline earth oxide) increases, a reaction of the pouzzolanic type occurs.

Here, the pouzzolanic effect can be a classic one, e.g., obtained by fixation, under the form of calcium silicate, by the fine Portlandite silica resulting from the hydration of the Portland cement. The pouzzolanic effect can also be obtained by the hydration in the presence of the large amount of fine silica in an aluminous cement (refractory hydraulic binder) under the form of hydrated pseudo-gehlenite.

The presence of these calcium silicates or calcium silico-aluminates is unfavorable to the refractory properties of the products of the present invention and must be minimized as much as possible. This reduction of the refractory properties is observed principally in a perceptible lowering of the settling temperature under load, an essential characteristic of refractory products relative to their use temperature limit.

This phenomenon is illustrated, for example, in the accompanying drawing which represents a curve of the variation of the settling temperature under load (the ordinate) of refractory products obtained with compositions of the present invention, produced with the same aggregate, as a function of the amount of calcium (the abscissa) of these compositions.

The temperature indicated in that at which is produced a settling of 0.5% under a load of 2 daNcm$^{-2}$, measured by the differential method (standard AFNOR NFB) 49-105 and standard ISO R 1893).

The amount of calcium indicated is that which results from the use of an aluminous hydraulic binder containing about 70% alumina and 27% calcium. This binder is known under the trade name "SECAR 71."

As this curve shows, it is sufficient for very little calcium to cause a perceptible lowering of the settling temperature under load.

In effect, when the amount of calcium passes from 0.027% to 0.135%, the settling temperature under load falls from 50° C. When it passes from 0.135% to 0.270% the settling temperature falls from 150° C.

In other words, the greater the amount of calcium in a composition is increased, the greater the performance of the refractory products obtained is reduced.

Certain characteristics (cohesion at cold after drying, for example) of the refractory product of the present invention can be obtained in two ways:
(1) by taking advantage of the gel bonding, that is to say, by establishing the composition in an environment of low alkaline earth content, this bonding being accompanied by good densification of the product; and
(2) by taking advantage inversely of the pouzzolanic effect by using only that amount of hydraulic binder strictly necessary for the perceptible development of this effect.

Bonding by means of silica gels is well known to the skilled artisan. But the present invention cannot be compared to such prior techniques. In effect, known silica gels contain a large amount of water and a small concentration of active material. Consequently, their use involves a large amount of water which is very unfavorable as far as the present invention is concerned since it imparts to the products a high porosity and a weak mechanical cohesion.

According to the present invention, the gel is formed in place, with essentially only that amount of water which is necessary for moistening the mixture.

To obtain the best results of the present invention, it is considered important to combine:
the good granulometric distribution with regard to the ultra-fine particles;
the fluidification of the components so as to obtain good homogenity even though only a small amount of water is used;
pressurizing the mixture at a value sufficient to bond the particles, by bringing them nearer to each other, or even by interlocking; and to cement the fine particles by the resulting gel.

The invention provides crude or raw products whose thermo-mechanical characteristics are at least equal to those calcined products of known techniques.

Moreover, the present invention provides a supplemental advantage with respect to known products in terms of their density and porosity.

The low porosity that is possible to obtain according to known techniques results from a fritting effect of the particles, this effect being observed by a large shrinkage during the calcination. As a consequence, it is quite difficult to maintain or achieve, with rigor, pre-selected dimensions for the product or to avoid deformations thereof.

The crude or raw products of the present invention can have porosities in the order of 10%. These same products if calcined, have a porosity as low as 5% but without a shrinkage greater than 1%. This represent a very good performance.

The proportions of the components used in accordance with the present invention are the following:

| refractory aggregate | 80–98 weight percent |
| --- | --- |
| binder | 2–20 weight percent |
| wherein: | |
| silica, vitreous or amorphous, is | 1.4–19.2 weight percent |
| alkaline earth oxides, supplied preferably by a hydraulic binder, are | 0.02–3 weight percent |
| and the dispersing agent is | 0.01–0.6 weight percent |

The nature of the refractory aggregate is essentially the same as that conventionally used and the particular aggregate selected depends on use contemplated, as well as other factors well known to the skilled artisan.

One characteristic of the present invention is that, to insure good granulometric distribution of the particles, the aggregate contains a preceptible fraction of ultra-fine particles (diameter lower than 20 μm). As a function of the amount of the binder, the desired result is generally achieved with an amount of ultra-fine particles ranging between 5 and 25 percent of the total weight of the aggregate.

The following non-limiting Examples are given to illustrate the present invention. In these Examples, the cement employed is "SECAR 71," which is an aluminous hydraulic binder having 70% alumina and 27% calcium.

EXAMPLE 1

Tabular alumina <3.3 mm—89.5%
Fine alumina <20 μm—5%
Binder—5.5%
comprising:
  sodium polyacrylate—0.03%
  cement, "SECAR 71"—1.5%
  silica, vitreous—3.97%
to which is added
Water—2.7%

These various components are introduced into a conventional mixer. The resulting mixture is then introduced, according to known techniques, into a mold subjected to the action of a hydraulic or mechanical press under a pressure of 400 bars.

The products obtained have the following characteristics:

| Thermal Treatment | 110° C. | 600° C. | 1000° C. | 1400° C. | 1500° C. | 1600° C. |
| --- | --- | --- | --- | --- | --- | --- |
| Apparent mass volume, g/cm$^3$ | 3.18 | 3.16 | 3.17 | 3.15 | 3.17 | 3.23 |
| Open porosity, % | 13.5 | 14.4 | 14.2 | 12.7 | 11 | 6.2 |
| Variation in linear dimension, % | — | 0 | −0.1 | −0.05 | −0.3 | −0.5 |
| Resistance to bending at 20° C. daN.cm$^{-2}$ | 136 | 170 | 460 | 503 | 474 | 638 |
| Settling temperature under load 0.5% | 1400° C. | — | — | — | 1550° C. | — |

EXAMPLE 2

Tabular alumina <3.3 mm—90%
Fine alumina <20 μm—5%
Binder—5% comprising:
    sodium polyacrylate—0.05%
    cement, "SECAR 71"—0.1%
    silica, vitreous <0.1 μm—4.85%
to which is added:
    water—3.2%

Repeating the procedures of Example 1 and shaping the products at 400 bars, the resulting products exhibit the following characteristics:

| Thermal Treatment | 110° C. | 1400° C. | 1500° C. |
|---|---|---|---|
| Apparent mass volume, g/cm$^3$ | 3.14 | 3.21 | 3.23 |
| Open porosity, % | 13 | 11 | 9.5 |
| Variations in linear dimensions, % | 0 | −0.4 | −0.5 |
| Resistance to bending at 20° C. daN.cm$^{-2}$ | 72 | 490 | 550 |
| Settling temperature under load 0.5% | 1600° C. | 1670° C. | — |

EXAMPLE 3

Tabular alumina <3.3 mm—90%
Fine alumina <20 μm—4.8%
Binder—5.2%
    comprising:
        sodium polyacrylate—0.05%
        cement "SECAR 71"—0.5%
        silica, vitreous <0.1 μm—4.65%
to which is added:
    water—3.3%

| Thermal treatment | 100° C. | 1600° C. |
|---|---|---|
| Apparent mass volume, g/cm$^3$ | 3.20 | 3.25 |
| Open porosity, % | 12.6 | 10.1 |
| Variations in linear dimensions, % | — | −0.45 |
| Resistance to bending at 20° C. daN.cm$^{-2}$ | 112 | 473 |
| Settling temperature under load 0.5% | 1550° C. | — |

Comparison of characteristics with equivalent calcined products of the prior art:

| Type of product Binder | 90% Al$_2$O$_3$ Clay based, by calcining (known technique) | 95% Al$_2$O$_3$ Mullitic, by calcining (known technique) | 95% Al$_2$O$_3$ Crude or raw this invention 0.1% cement | 95% Al$_2$O$_3$ Crude or raw this invention 0.5% cement | 95% Al$_2$O$_3$ This invention, after calcining 0.1% cement |
|---|---|---|---|---|---|
| Density, g/cm$^3$ | 3.0 | 3.15 | 3.17 | 3.20 | 3.27 |
| Porosity, % | 18/19 | 16 | 13/14 | 12/13 | 9/10 |
| Resistance to bending, 20° C. daN.cm$^{-2}$ | 150 | 180 | 90 | 110 | 450 |
| Resistance to bending, 1500° C. daN.cm$^{-2}$ | 20 | 70 | 65 | 50 | 95 |
| Settling temperature under load 0.5% | 1620° C. | 1650° C. | 1600° C. | 1550° C. | 1670° C. |

As can be seen from the above table, the essential characteristics of the crude or raw products based on 95% Al$_2$O$_3$ are at least identical, and even superior, to those of known calcined products. The properties of the products of this invention calcined at 1500° C. are clearly superior at all levels, to those equivalent products of the prior art.

The products of the present invention being stored a sufficient time to permit solidification, are dried so as to remove free water. These products can, of course, be calcined, this calcination often improving their characteristics. Nonetheless calcining is not necessary and generally considerably increases the cost of the product.

What is claimed is:

1. A pulverulent composition for admixture with a refractory aggregate and water, and for molding without hydraulic bonding, so as to provide pressed refractory articles, including bricks for the construction of thermal enclosures, comprising as a first portion, 70-96% by weight of silica, either vitreous or amorphous, of which the particles have a diameter lower than 1 μm; as a second portion, 4-30% by weight of a compound capable of supplying 1-20% by weight of alkaline earth oxide; and as a third portion, 0.5-3% by weight of a fluidizing or dispersing agent.

2. A mixture for use in the production of refractory articles, including bricks for the construction of thermal enclosures, comprises the pulverulent composition of claim 1 together with a refractory aggregate of which at least 5 weight percent are particles having a diameter lower than 20 μm, said aggregate being present in an amount of 80 to 98% of the total weight of said mixture, and wherein said silica, vitreous or amorphous, comprises particles having a diameter lower than 1 μm, present in an amount of 1.4-19.2 weight percent, said compound capable of supplying alkaline earth oxide being present in an amount of 0.08-2 weight percent and said fluidizing or dispersing agent being present in an amount less than 0.6 weight percent.

3. The mixture of claim 2 which contains 0.1 to 1 percent by weight of said compound capable of supplying alkaline earth oxide.

4. The mixture of claim 3 which contains 4 to 10 percent by weight of silica, vitreous or amorphous.

5. An article made from the mixture of claim 2.

* * * * *